US008359055B2

(12) United States Patent
Usuda et al.

(10) Patent No.: US 8,359,055 B2
(45) Date of Patent: *Jan. 22, 2013

(54) TRANSMISSION POWER CONTROL METHOD, AND RADIO NETWORK CONTROLLER

(75) Inventors: Masafumi Usuda, Tokyo (JP); Anil Umesh, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 666 days.

This patent is subject to a terminal disclaimer.

(21) Appl. No.: 11/508,985

(22) Filed: Aug. 24, 2006

(65) Prior Publication Data
US 2007/0049321 A1 Mar. 1, 2007

(30) Foreign Application Priority Data
Aug. 24, 2005 (JP) ................................ P2005-274649

(51) Int. Cl.
H04B 7/00 (2006.01)
(52) U.S. Cl. ........... 455/522; 455/517; 455/69; 370/328
(58) Field of Classification Search .................. 370/342, 370/328, 331–335, 318, 311, 230, 252, 330, 370/395.21–395.41, 412, 465; 455/69, 522, 455/67.11, 67.13, 115.1, 115.3, 432.1, 436–444, 455/135, 226.3, 212, 254, 230, 515, 151.1, 455/182.1, 343.4, 439, 452.1, 452.2, 509
See application file for complete search history.

(56) References Cited

U.S. PATENT DOCUMENTS

| 6,708,041 | B1* | 3/2004 | Butovitsch et al. | 455/522 |
| 2003/0112773 | A1* | 6/2003 | Lee et al. | 370/318 |
| 2003/0114181 | A1* | 6/2003 | Lee et al. | 455/522 |
| 2003/0228876 | A1* | 12/2003 | Hwang | 455/522 |
| 2004/0114555 | A1* | 6/2004 | Hayashi et al. | 370/329 |
| 2005/0111389 | A1* | 5/2005 | Dick et al. | 370/278 |
| 2005/0239413 | A1* | 10/2005 | Wiberg et al. | 455/69 |
| 2006/0034240 | A1* | 2/2006 | Kwak et al. | 370/342 |
| 2006/0281414 | A1* | 12/2006 | Lindoff et al. | 455/67.11 |

(Continued)

FOREIGN PATENT DOCUMENTS

EP 1 624 629 A2 2/2006
EP 1 720 264 A1 11/2006

OTHER PUBLICATIONS

"Universal Mobile Telecommunications System (UMTS)" ETSI Standards, European Telecommunications Standards Institute, Sophia-Antipo, FR, vol. 3-R1, No. V650, Mar. 2005, XP014027623.

(Continued)

Primary Examiner — Chuong A Ngo
(74) Attorney, Agent, or Firm — Marvin A. Motsenbocker; Mots Law, PLLC

(57) ABSTRACT

A transmission power control method for controlling a transmission power of an E-DPCCH, includes: determining, at a radio network controller, that a mobile station transmitting the E-DPCCH to only a first cell transmits the E-DPCCH to the first cell and a second cell; determining, at the radio network controller, an E-DPCCH Transmission Power Offset which is an offset from a transmission power of a DPCCH based on the determination; notifying, at the radio network controller, the E-DPCCH Transmission Power Offset to the mobile station; determining, at the mobile station, the transmission power of the E-DPCCH to be transmitted to the first cell and the second cell, based on the notified E-DPCCH Transmission Power Offset; and transmitting, at the mobile station, the E-DPCCH to the first cell and the second cell using the determined transmission power.

5 Claims, 13 Drawing Sheets

U.S. PATENT DOCUMENTS

2007/0086381 A1* 4/2007 Lee et al. .................. 370/331

OTHER PUBLICATIONS

"Universal Mobile Telecommunications System (UMTS)" ETSI Standards, European Telecommunications Standards Institute, Sophia-Antipo, FR, vol. 3-R1, No. V620, Mar. 2005, XP014027620.

3GPP TSG-RAN 2#47 R2-051398; Athens, Greece, May 9-13, 2005; Source: NTT DoCoMo, Inc.; Title: Need for Outer loop power control for E-DPCCH.

The Extended European search report issued on Sep. 16, 2011 in the counterpart European patent application.

* cited by examiner

TRANSMISSION POWER CONTROL METHOD, AND RADIO NETWORK CONTROLLER

CROSS REFERENCE TO RELATED APPLICATION

This application is based upon and claims the benefit of priority from the prior Japanese Patent Application No. P2005-274649, filed on Aug. 24, 2005; the entire contents of which are incorporated herein by reference.

BACKGROUND OF THE INVENTION

1. Field of the Invention

The present invention relates to a transmission power control method and a radio network controller.

2. Description of the Related Art

In a conventional mobile communication system, when setting a Dedicated Physical Channel (DPCH) between a mobile station UE and a radio base station Node B, a radio network controller RNC is configured to determine a transmission rate of uplink user data, in consideration of hardware resources for receiving of the radio base station Node B (hereinafter, hardware resource), a radio resource in an uplink (an interference volume in an uplink), a transmission power of the mobile station UE, a transmission processing performance of the mobile station UE, a transmission rate required for an upper application, or the like, and to notify the determined transmission rate of the uplink user data by a message of a layer-3 (Radio Resource Control Layer) to both of the mobile station UE and the radio base station Node B.

Here, the radio network controller RNC is provided at an upper level of the radio base station Node B, and is an apparatus configured to control the radio base station Node B and the mobile station UE.

In general, data communications often cause burst traffic compared with voice communications or TV communications. Therefore, it is preferable that a transmission rate of a channel used for the data communications is changed fast.

However, as shown in FIG. 1, the radio network controller RNC integrally controls a plurality of radio base stations Node B in general. Therefore, in the conventional mobile communication system, there has been a problem that it is difficult to perform fast control for changing of the transmission rate of uplink user data (for example, per approximately 1 through 100 ms), due to the increase of processing load and processing delay in the radio network controller RNC.

In addition, in the conventional mobile communication system, there has been also a problem that costs for implementing an apparatus and for operating a network are substantially increased even if the fast control for changing of the transmission rate of the uplink user data can be performed.

Therefore, in the conventional mobile communication system, control for changing of the transmission rate of the uplink user data is generally performed on the order from a few hundred ms to a few seconds.

Accordingly, in the conventional mobile communication system, when burst data transmission is performed as shown in FIG. 2A, the data are transmitted by accepting low-speed, high-delay, and low-transmission efficiency as shown in FIG. 2B, or, as shown in FIG. 2C, by reserving radio resources for high-speed communications to accept that radio bandwidth resources in an unoccupied state and hardware resources in the radio base station Node B are wasted.

It should be noted that both of the above-described radio bandwidth resources and hardware resources are applied to the vertical radio resources in FIGS. 2B and 2C.

Therefore, the 3rd Generation Partnership Project (3GPP) and the 3rd Generation Partnership Project 2 (3GPP2), which are international standardization organizations of the third generation mobile communication system, have discussed a method for controlling radio resources at high speed in a layer-1 and a media access control (MAC) sub-layer (a layer-2) between the radio base station Node B and the mobile station UE, so as to utilize the uplink radio resources effectively. Such discussions or discussed functions will be hereinafter referred to as "Enhanced Uplink (EUL)".

Referring to FIG. 3, the mobile communication system, to which the "Enhanced Uplink" is applied, is explained.

In FIG. 3, the mobile station UE is establishing a radio link with only a cell #10 controlled by the radio base station Node B #1 (hereinafter, the cell which is controlled by the radio base station Node B is indicated as cell).

Here, in FIG. 3, an example that the mobile station UE in a Non-SHO state shifts to a SHO state where radio links with the cell #10 as well as a cell #20 are established is shown.

In such a case, the mobile station UE is configured to determine a transmission power of an "Enhanced Dedicated Physical Control Channel (E-DPCCH)", based on a transmission power ratio between a transmission power of a "Dedicated Physical Channel (DPCH)" to which a closed loop transmission power control is performed and a transmission power of an E-DPCCH.

Here, the radio link includes the DPCH or an "Enhanced Dedicated Physical Channel (E-DPCH)" between the mobile station UE and the radio base station Node B.

In step S2001, the mobile station UE is establishing a data connection (E-DPDCH) for transmitting the uplink user data with the radio network controller RNC via the cell #10.

In step S2002, when the reception power of a common pilot channel from the cell #20 become more than or equal to the predetermined value, the mobile station UE transmits measurement report to the radio network controller RNC.

In step S2003, the radio network controller RNC requests the radio base station Node B #2 controlling the cell #20 to establish synchronization of radio links for uplink between the mobile station UE and the cell #20, based on the transmitted measurement report.

To be more specific, in step S2003, the radio network controller RNC transmits, to the radio base station Node B #2, a SHO setting request including SHO parameters. For example, the SHO parameters include a start time of the SHO.

In step S2004, the cell #20 transmits a SHO setting response for indicating that the cell #20 has received the SHO setting request.

In step S2005, the radio network controller RNC requests the mobile station UE to establish synchronization of radio links for downlink between the cell #20 and the mobile station UE.

To be more specific, in step S2005, the radio network controller RNC transmits, to the mobile station UE, a SHO setting request including the SHO parameters. In step S2006, the mobile station UE transmits a SHO setting response for indicating that the mobile station UE has received the SHO setting request.

The mobile station UE shifts from the Non-SHO state to the SHO state based on the SHO parameters. In step S2007, the mobile station becomes in the SHO state with the cell #10 and the cell #20.

Based on the above steps, the mobile station UE in the EUL is configured to connect to a plurality of cells simultaneously in the SHO state, so as to prevent the interruption of communication.

Here, with regard to a certain mobile station US, a set of radio links established between the mobile station UE and the cell controlled by the radio base station Node B will be called as an "active set".

The active set will be updated, for example, when the mobile station UE shifts between the Non-SHO state and the SHO state, or when the cells to which the mobile station UE establishes radio links are changed.

However, in the above method, when the active set is updated, the E-DPCCH transmission power offset, which is used to determine the transmission power required to receive, at the radio base station Node B, the E-DPCCH from the mobile station UE, will be drastically changed. Accordingly, the radio base station Node B cannot receive the E-DPCCH from the mobile station UE.

Further, there has been a problem that if the radio base station Node B cannot receive the E-DPCCH from the mobile station UE, the radio base station Node B cannot transmit ACK/NACK to the mobile station UE.

In such case, the probability of falsely detecting the ACK increases in the mobile station UE, and the probability that the mobile station UE transmits the subsequent uplink user data when it should have retransmitted the previous data increases. Accordingly, the data loss rate is increased, and the transmission efficiency will deteriorate drastically.

BRIEF SUMMARY OF THE INVENTION

The present invention has been made considering the problems, and its object is to provide a transmission power control method which enables to certainly transmit an E-DPCCH to a radio base station Node B when an active set is updated, so as to realize a stable radio communication for uplink, and to reduce a deterioration of radio network capacity, and a radio network controller.

A first aspect of the present invention is summarized as a transmission power control method for controlling a transmission power of an Enhanced Dedicated Physical Control Channel, includes: determining, at a radio network controller, that a mobile station transmitting the Enhanced Dedicated Physical Control Channel to only a first cell transmits the Enhanced Dedicated Physical Control Channel to the first cell and a second cell; determining, at the radio network controller, an Enhanced Dedicated Physical Control Channel transmission power offset which is an offset from a transmission power of a dedicated physical control channel based on the determination; notifying, at the radio network controller, the Enhanced Dedicated Physical Control Channel transmission power offset to the mobile station, determining, at the mobile station, the transmission power of the Enhanced Dedicated Physical Control Channel to be transmitted to the first cell and the second cell, based on the notified Enhanced Dedicated Physical Control Channel transmission power offset; and transmitting, at the mobile station, the Enhanced Dedicated Physical Control Channel to the first cell and the second cell using the determined transmission power.

A second aspect of the present invention is summarized as a radio network controller used in a mobile communication system in which a mobile station controls a transmission power of an Enhanced Dedicated Physical Control Channel, including: a determiner configured to determine that a mobile station transmitting the Enhanced Dedicated Physical Control Channel to only a first cell transmits the Enhanced Dedicated Physical Control Channel to the first cell and a second cell; an offset determiner configured to determine an Enhanced Dedicated Physical Control Channel transmission power offset which is an offset from a transmission power of a dedicated physical control channel based on the determination; and an offset notifier configured to notify the Enhanced Dedicated Physical Control Channel transmission power offset to the mobile station.

DETAILED DESCRIPTION OF THE INVENTION

Configuration of Mobile Communication System According to First Embodiment of the Present Invention Referring to FIGS. 4 to 16, a configuration of a mobile communication system according to a first embodiment of the present invention will be described.

It should be noted that, the mobile communication system according to this embodiment is designed in order to increase a communication performance such as a communication capacity, a communication quality and the like. Further, the mobile communication system according to this embodiment can be applied to "W-CDMA" and "CDMA2000" of the third generation mobile communication system.

Figure 1:
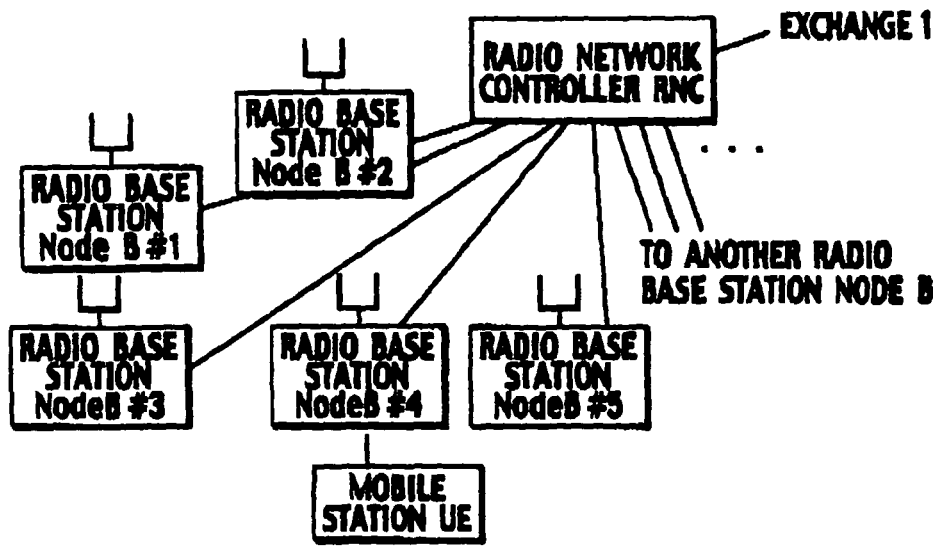
FIG. 1 is diagram of an entire configuration of a general mobile communication system.
Figure 2A:
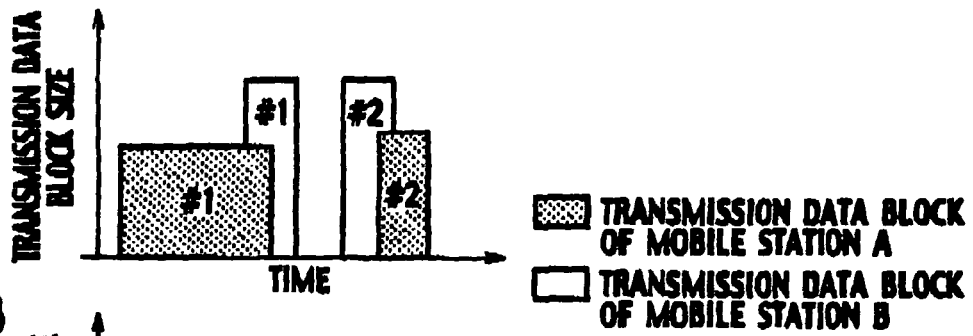
FIGS. 2A to 2C are diagrams for explaining a method for controlling a transmission rate of uplink used data in a conventional mobile communication system.
Figure 2B:
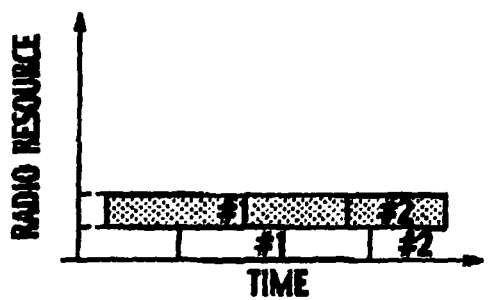
Figure 2C:
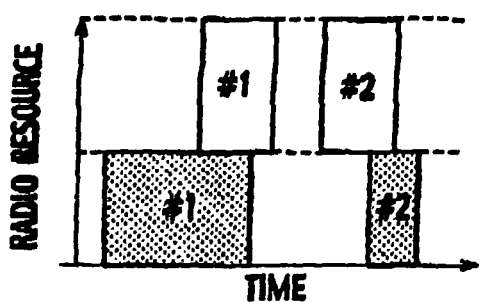
Figure 3:
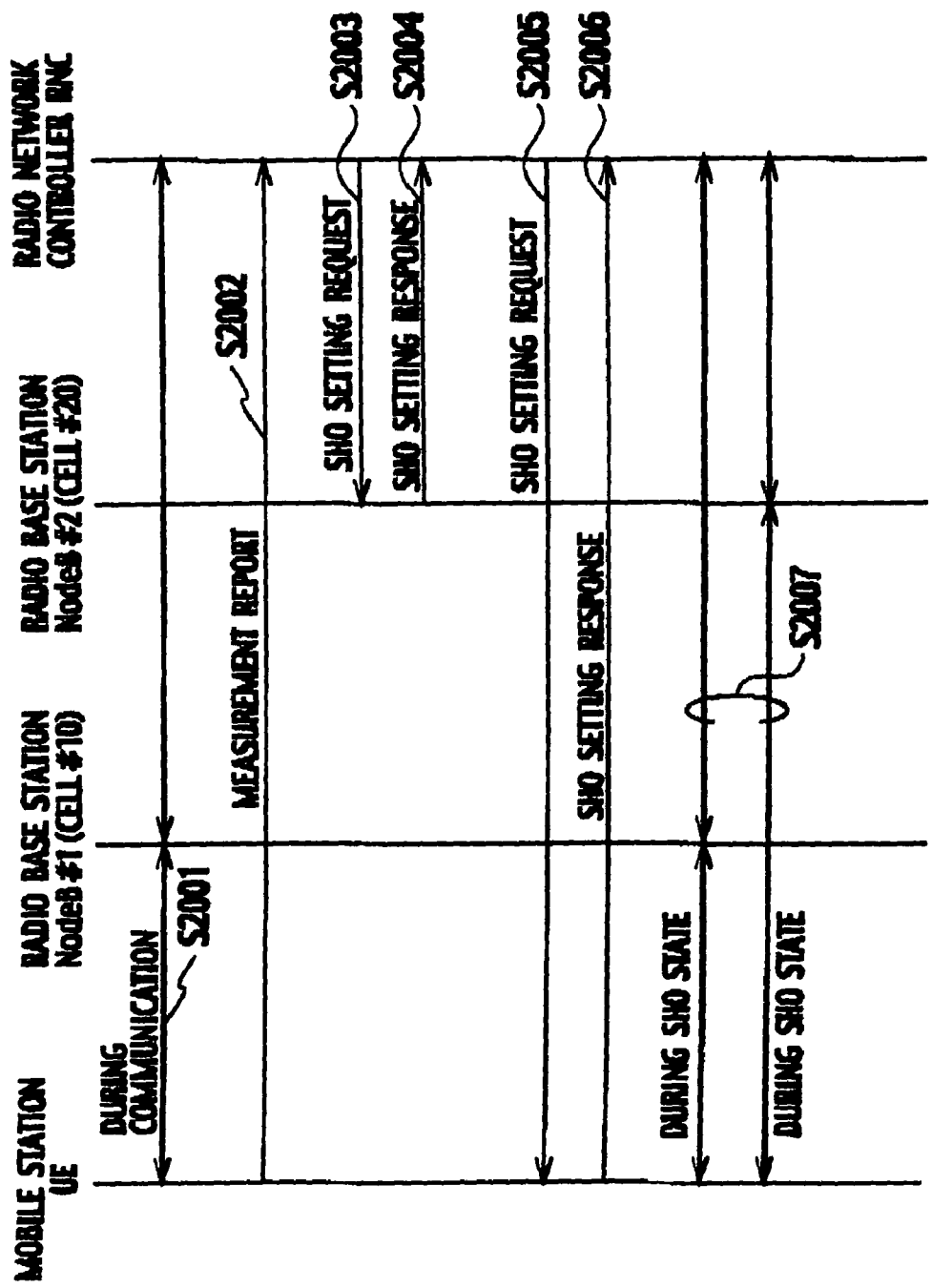
FIG. 3 is a diagram for explaining the transmission rate control method in the conventional mobile communication system.
Figure 4:
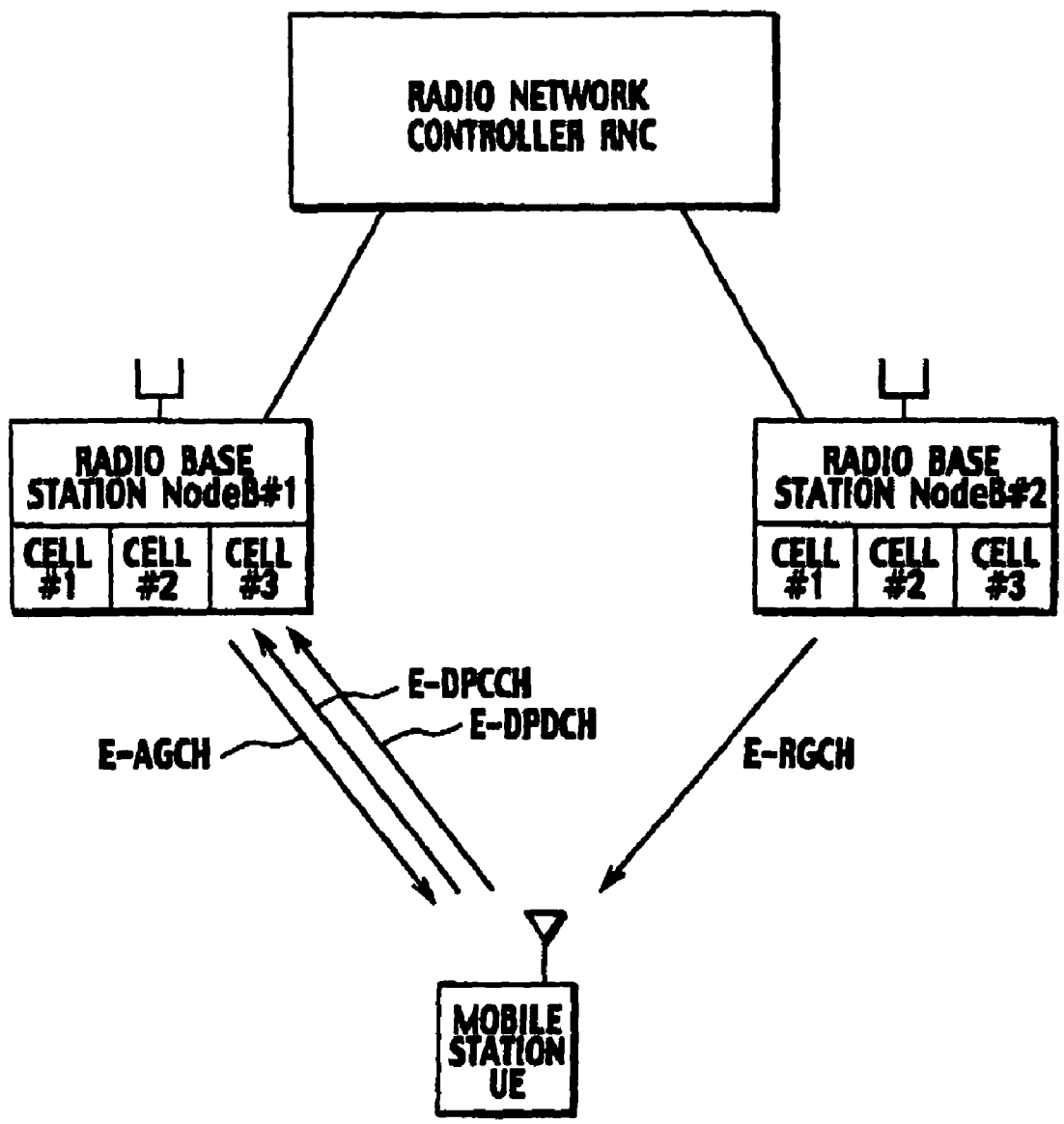
FIG. 4 is a diagram of an entire configuration of mobile communication system according to a first embodiment of the present invention.

In the example of FIG. 4, the cell #3 controlled by the radio base station Node B #1, which has received a "Dedicated Physical Channel (hereinafter, DPCH)" transmitted from the mobile station UE, is configured to determine an increase/decrease of a transmission power of the DPCH in the mobile station UE, based on the reception power of the DPCH, and to transmit the result of increase/decrease of the transmission power of the DPCH to the mobile station UE, by using TPC command (for example, Up Command, Down Command).

Further, the radio base station Node B #1 which controls the cell #3 is configured to control the transmission power of the DPCH for transmitting to the mobile station UE, by using the TPC command transmitted from the mobile station UE.

Furthermore, the mobile station UE is configured to determine the transmission power of an "Enhanced Dedicated Physical Control Channel (E-DPCCH)" to be transmitted to the cell #3, based on the Enhanced Dedicated Physical Control Channel transmission power offset (hereinafter, E-DPCCH transmission power offset).

Figure 5:
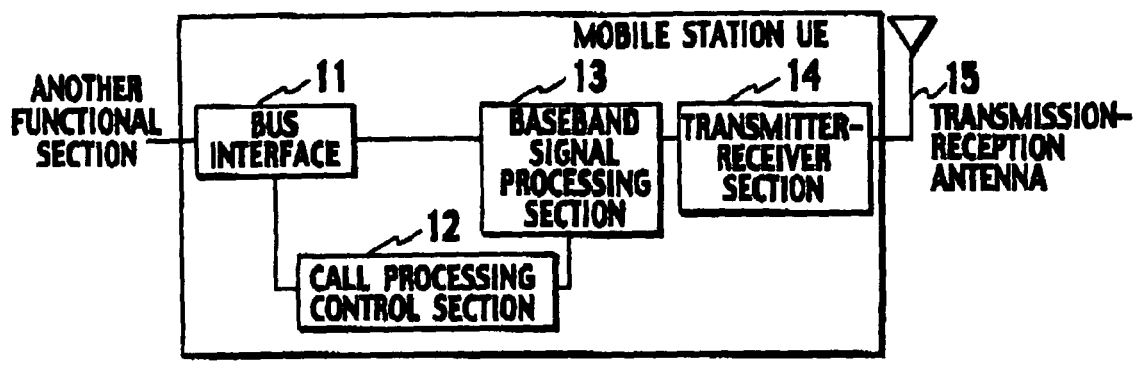
FIG. 5 is a functional block diagram of a mobile station in the mobile communication system according to the first embodiment of the present invention.

An example of general configuration of a mobile station UE according to this embodiment is shown in FIG. 5.

As shown in FIG. 5, the mobile station UE is provided with a bus interface 11, a call processing control section 12, a baseband signal processing section 13, a transmitter-receiver section 14, and a transmission-reception antenna 15. In addition, the mobile station UE can be configured to include an amplifier section (not shown in FIG. 5).

However, these functions do not have to be independently present as hardware. That is, these functions can be partly or entirely integrated, or can be configured through a process of software.

Figure 6:
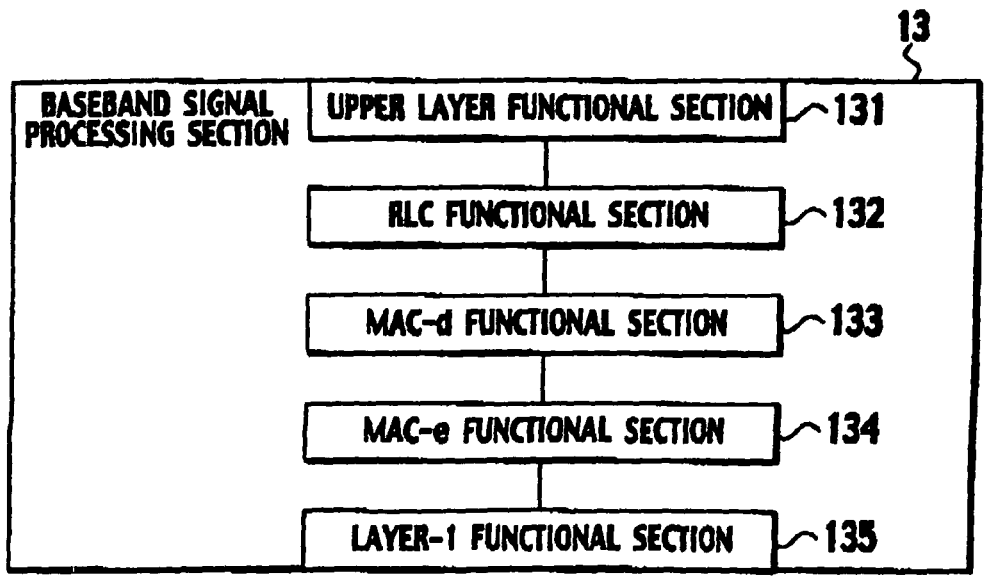
FIG. 6 is a functional block diagram of a baseband signal processing section of the mobile station in the mobile communication system according to the first embodiment of the present invention.

In FIG. 6, a functional block of the baseband signal processing section 13 is shown.

As shown in FIG. 6, the baseband signal processing section 13 is provided with an upper layer functional section 131, a RLC functional section 132, a MAC-d functional section 133, a MAC-e functional section 134, and a layer-1 functional section 135.

The RLC functional section 132 is configured to work as RLC sublayer. The layer-1 functional section 135 is configured to work as a layer-1.

Figure 7:
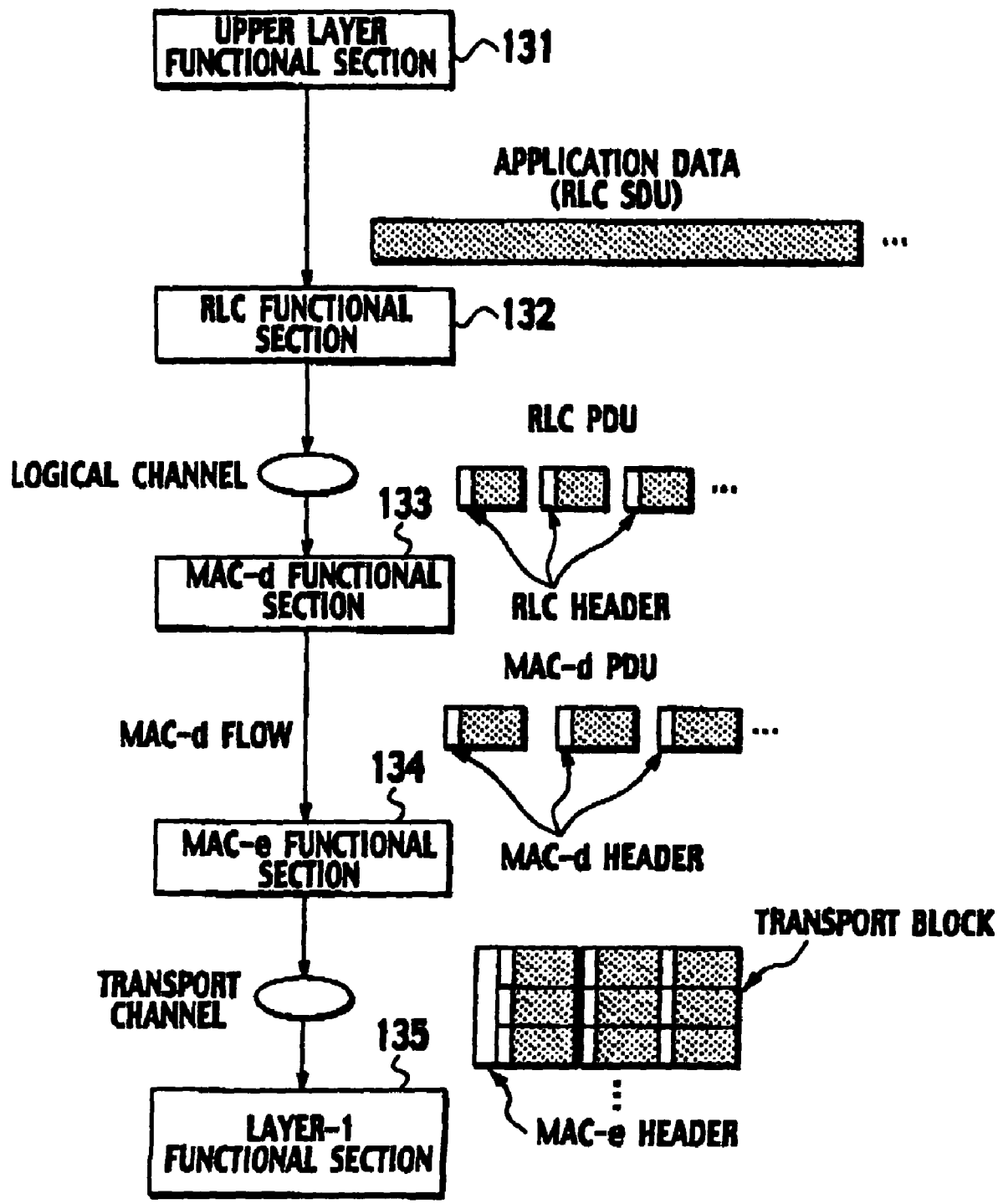
FIG. 7 is a diagram for explaining functions of the baseband signal processing section of the mobile station in the mobile communication system according to the first embodiment of the present invention.

As shown in FIG. 7, the RLC functional section 132 is configured to divide an application data (RLC SDU), which is received from the upper layer functional section 131, into PDUs of a predetermined PDU size. Then, the RLC functional section 132 is configured to generate RLC PDUs by adding a RLC header used for a sequence control processing, retransmission processing, and the like, so as to pass the RLC PDUs to the MAC-d functional section 133.

Here, a pipeline works as a bridge between the RLC functional section 132 and the MAC-d functional section 133 is a "logical channel". The logical channel is classified based on the contents of data to be transmitted/received, and when a communication is performed, it is possible to establish a plurality of logical channels in one connection. In other words, when the communication is performed, it is possible to transmit/receive a plurality of data with different contents (for example, control data and user data, or the like) logically in parallel.

The MAC-d functional section 133 is configured to multiplex the logical channels, and to add a MAC-d header associated with the multiplex of the logical channels, so as to generate a MAC-d PDU. A plurality of MAC-d PDUs are transferred from the MAC-d functional section 133 to the MAC-e functional section 134 as MAC-d flow.

The MAC-e functional section 134 is configured to assemble a plurality of MAC-d PDUs which are received from the MAC-d functional section 133 as MAC-d flow, and to add a MAC-e header to the assembled MAC-d PDU, so as to generate a transport block. Then, the MAC-e functional section 134 is configured to pass the generated transport block to the layer-1 functional section 135 through a transport channel.

Figure 8:
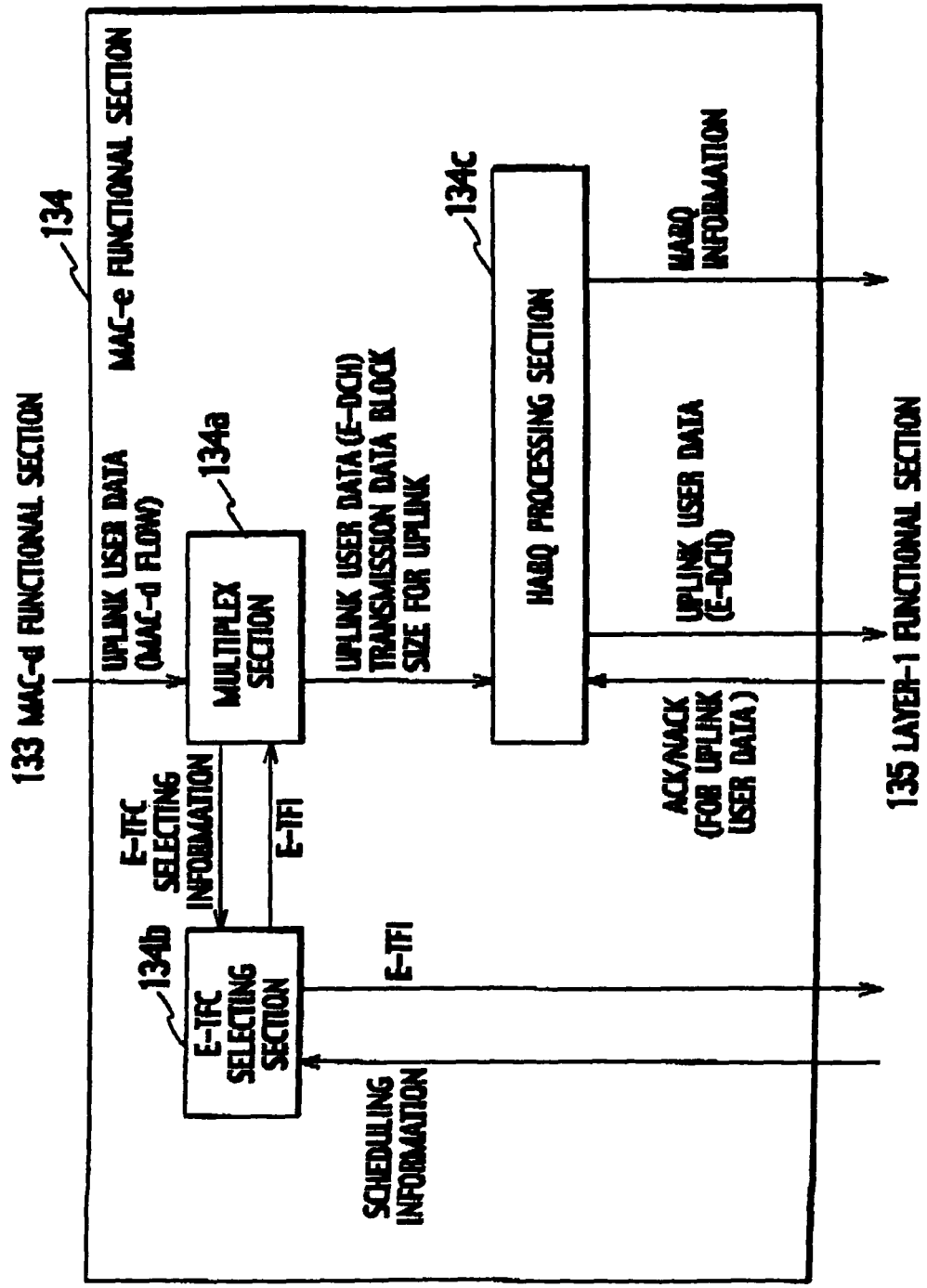
FIG. 8 is a functional block diagram of a MAC-e functional section in the baseband signal processing section of the mobile station in the mobile communication system according to the first embodiment of the present invention.

In addition, the MAC-e functional section 134 is configured to work as a lower layer of the MAC-d functional section 133, and to implement the retransmission control function according to Hybrid ARQ (HARQ) and the transmission rate control function specifically, as shown in FIG. 8, the MAC-e functional section 134 is provided with a multiplex section 134*a*, an E-TFC selecting section 134*b*, and an HARQ processing section 134*c*.

The multiplex section 134*a* is configured to perform a multiplex processing to the uplink user data, which is received from the MAC-d functional section 133 as MAC-d flow, based on a "Enhanced-Transport Format Indicator (E-TFI)" notified from the E-TFC selecting section 134*b*, so as to generate uplink user data (a Transport Block) to be transmitted via a transport channel (E-DCH). Then, the multiplex section 134*a* is configured to transmit the generated uplink user data (Transport Block) to the HARQ processing section 134*c*.

Hereinafter, the uplink user data received as MAC-d flow is indicated as the "uplink user data (MAC-d flow)", and the uplink user data to be transmitted via the transport channel (E-DCH) is indicated as the "uplink user data (E-DCH)".

The E-TFI is an identifier of a transport format, which is a format for providing the transport block on the transport channel (E-DCH) per TTI, and the E-TFI is added to the MAC-e header.

The multiplex section 134*a* is configured to determine a transmission data block size to be applied for the uplink user data based on the E-TFI notified from the E-TFC selecting section 134*b*, and to notify the determined transmission data block size to the HARQ processing section 134*c*.

In addition, when the multiplex section 134*a* receives the uplink user data from the MAC-d functional section 133 as MAC-d flow, the multiplex section 134*a* is configured to notify, to the E-TFC selecting section 134*b*, E-TFC selecting information for selecting a transport format for the received uplink user data.

Here, the E-TFC selecting information includes data size and priority class of the uplink user data, or the like.

The HARQ processing section 134*c* is configured to perform the retransmission control processing for the "uplink user data (E-DCH)" according to the "N channel stop and wait (N-SAW) protocol", based on ACK/NACK for the uplink user data notified from the layer-1 functional section 135.

In addition, the HARQ processing section 134c is configured to transmit, to the layer-1 functional section 135, the "uplink user data (E-DCH)" received from the multiplex section 134a, and HARQ information (for example, a number for retransmission, and the like) used for the HARQ processing.

The E-TFC selecting section 134b is configured to determine the transmission rate of the uplink user data by selecting the transport format (E-TF) to be applied to the "uplink user data (E-DCH)".

Specifically, the E-TFC selecting section 134b is configured to determine whether the transmission of the uplink user data should be performed or stopped, based on scheduling information, the amount of data in MAC-d PDU, the condition of hardware resource of the radio base station Node B, and the like.

The scheduling information (such as absolute transmission rate and a relative transmission rate of the uplink user data) is received from the radio base station Node B, the amount of data in MAC-d PDU (such as data size of the uplink user data) is passed from the MAC-d functional section 133, and the condition of hardware resource of the radio base station Node B is controlled in the MAC-e functional section 134.

Then, the E-TFC selection section 134b is configured to select the transport format (E-TF) to be applied to transmission of the uplink user data, and to notify the E-TFI for identifying the selected transport format to the layer-1 functional section 135 and the multiplex section 134a.

For example, the E-TFC selecting section 134b is configured to store the transmission rate of uplink user data in association with the transport format, to update the transmission rate of uplink user data based on the scheduling information from the layer-1 functional section 135, and to notify, to the layer-1 functional section 135 and the multiplex section 134a, the E-TFI for identifying the transport format which is associated with the updated transmission rate of uplink user data.

Here, when the E-TFC selecting section 134b receives the absolute transmission rate of the uplink user data from the serving cell for the mobile station UE via the E-AGCH as the scheduling information, the E-TFC selecting section 134b is configured to change the transmission rate of the uplink user data to the received absolute transmission rate of the uplink user data.

In addition, when the E-TFC selecting section 134b receives the relative transmission rate of the uplink user data (Down command or Don't care command) from the non-serving cell for the mobile station UE via the E-RGCH as the scheduling information, the E-TFC selecting section 134b is configured to increase/decrease the transmission rate of the uplink user data, at the timing of receiving the relative transmission rate, by the predetermined rate based on the relative transmission rate of the uplink user data.

In this specification, the transmission rate of the uplink user data can be a rate which can transmit an uplink user data via an "Enhanced Dedicated Physical Data Channel (E-DPDCH)", a transmission data block size (TBS) for transmitting an uplink user data, a transmission power of an "E-DPDCH", or a transmission power ratio (a transmission power offset) between an "E-DPDCH" and a "Dedicated Physical Control Channel (DPCCH)".

Figure 9:
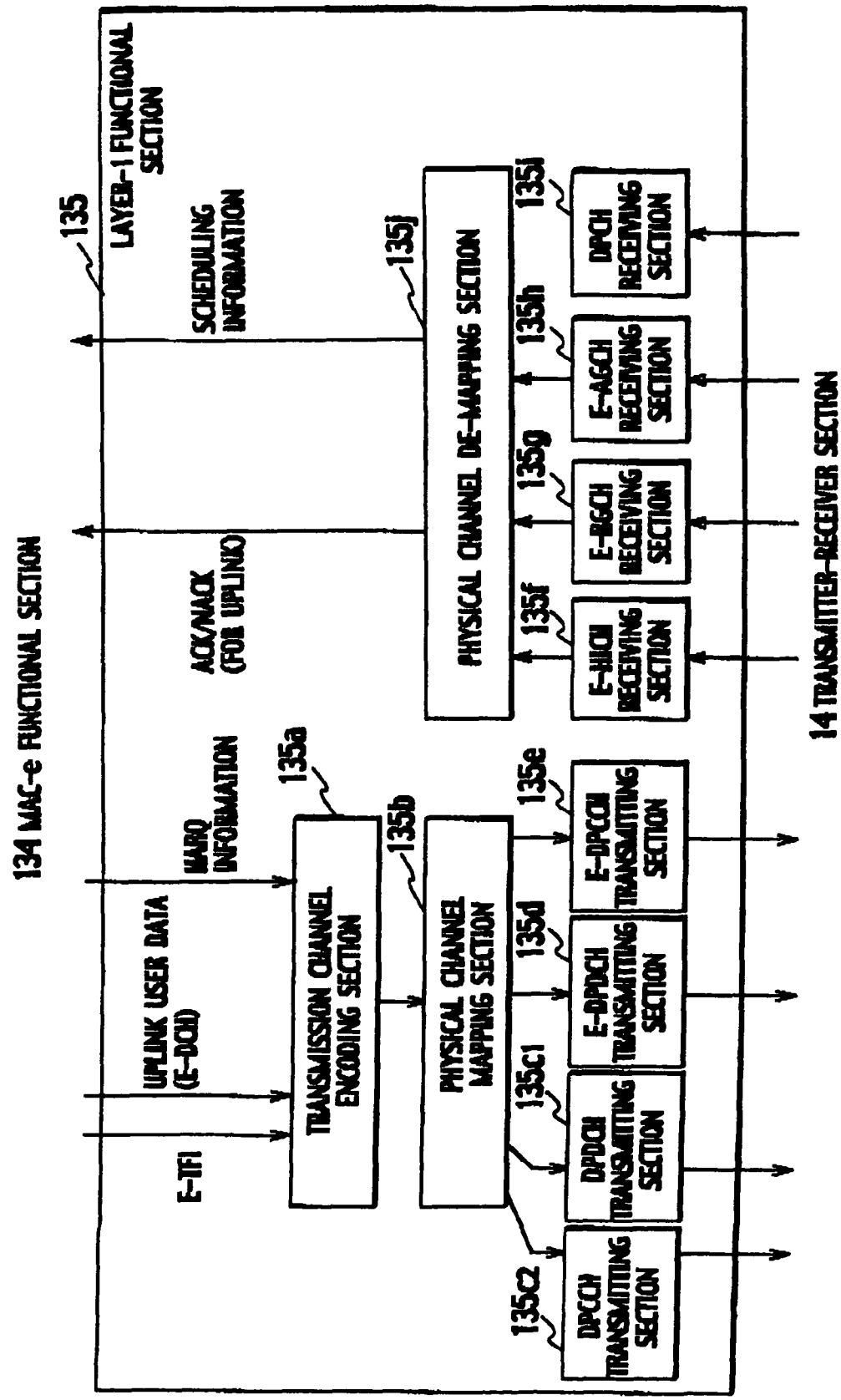
FIG. 9 is a functional block diagram of a layer-1 functional section in the baseband signal processing section of the mobile station in the mobile communication system according to the first embodiment of the present invention.

As shown in FIG. 9, the layer-1 functional section 135 is provided with a transmission channel encoding section 135a, a physical channel mapping section 135b, a DPDCH transmitting section 135c1, a DPCCH transmitting section 135c2, an E-DPDCH transmitting section 135d, an E-DPCCH transmitting section 135e, an E-HICH receiving section 135f, an E-RGCH receiving section 135g, an E-AGCH receiving section 135h, a physical channel de-mapping section 135j, and a DPCH receiving section 135i.

Figure 10:
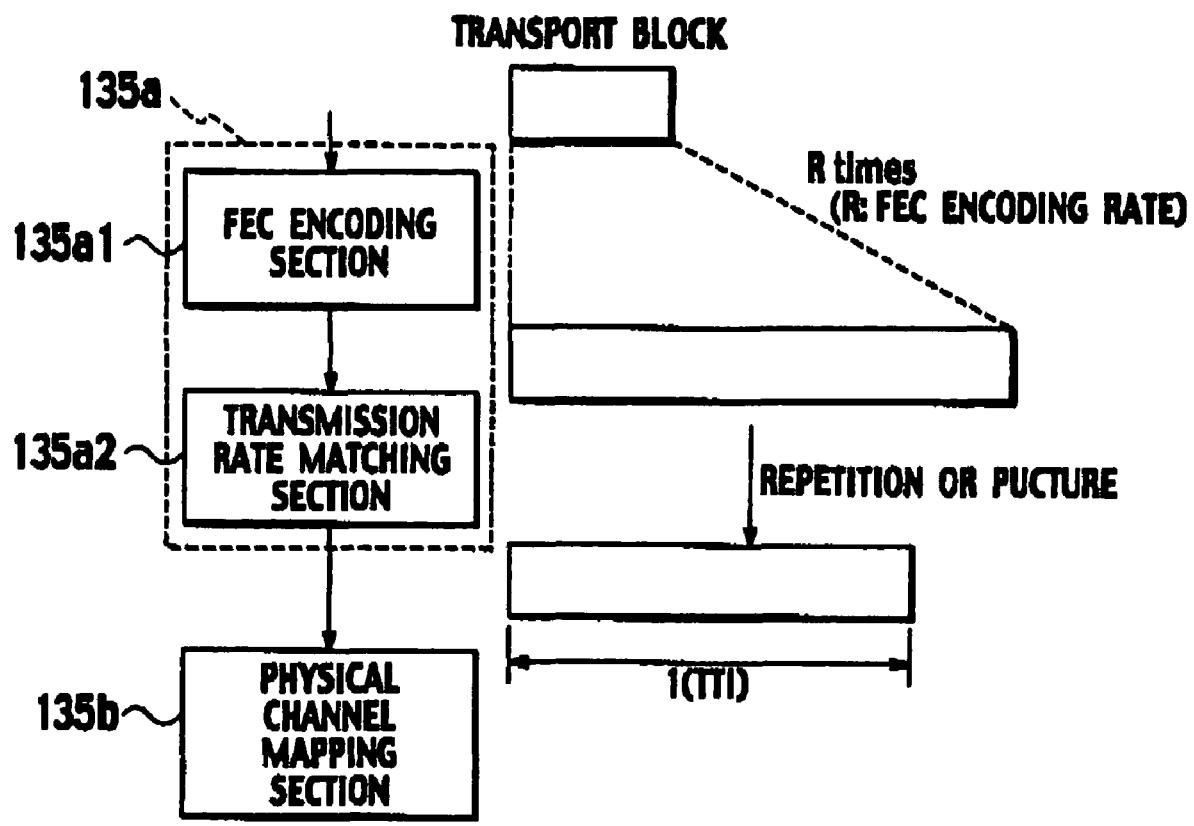
FIG. 10 is a diagram for explaining functions of the layer-1 functional section in the baseband signal processing section of the mobile station in the mobile communication system according to the first embodiment of the present invention.

As shown in FIG. 10, the transmission channel encoding section 135a is provided with a FEC (Forward Error Correction) encoding section 135a1, and a transmission rate matching section 135a2.

As shown in FIG. 10, the FEC encoding section 135a1 is configured to perform the error correction encoding processing toward the "uplink user data (E-DCH)", that is, the transport block, transmitted from the MAC-e functional section 134.

In addition, as shown in FIG. 10, the transmission rate matching section 135a2 is configured to perform, toward the transport block to which the error correction encoding processing is performed, the processing of "repetition (repeat of bit)" and "puncture (bit skipping)" in order to match to the transmission capacity in the physical channel.

The physical channel mapping section 135b is configured to pair the "uplink user data (E-DCH)" from the transmission channel encoding section 135a with the E-DPDCH, and to pair the E-TFI and the HARQ information from the transmission channel encoding section 135a with the E-DPCCH.

The DPDCH transmitting section 135c1 is configured to perform a transmission processing of a "Dedicated Physical Data Channel (DPDCH)" for uplink user data. The DPDCH is used for transmitting the uplink user data to be transmitted by the mobile station UE.

Here, the above uplink user data includes a measurement report, which reports transmission power of a common pilot channel transmitted from the cell.

The DPCCH transmitting section 135c2 is configured to perform a transmission processing of a "Dedicated Physical Control Channel (DPCCH)" for uplink. The transmission power of the DPCCH for uplink is controlled by the transmission power control method using the TPC command.

The E-DPDCH transmitting section 135d is configured to perform a transmission processing of the E-DPDCH.

The E-DPCCH transmitting section 135e is configured to perform a transmission processing of the E-DPCCH.

Furthermore, the E-DPCCH transmitting section 135e is configured to transmit the E-DPCCH using the transmission power determined based on the E-DPCCH transmission power offset.

The E-HICH receiving section 135f is configured to receive an "E-DCH HARQ Acknowledgement Indicator Channel (E-HICH)" transmitted from the cells (the serving cell and the non-serving cell for the mobile station UE).

The E-RGCH receiving section 135g is configured to receive the E-RGCH transmitted from the cells (the serving cell and the non-serving cell for the mobile station UE).

The E-AGCH receiving section 135h is configured to receive the E-AGCCH transmitted from the cell (the serving cell for the mobile station UE).

The physical channel de-mapping section 135j is configured to extract the scheduling information (the relative transmission rate of the uplink user data, that is, Up command/Down command/Don't care command) which is included in the E-RGCH received by the E-RGCH receiving section 135g, so as to transmit the extracted scheduling information to the MAC-e functional section 134.

In addition, the physical channel de-mapping section 135j is configured to extract the scheduling information (the absolute transmission rate of the uplink user data) which is included in the E-AGCH received by the E-AGCH receiving section 135h, so as to transmit the extracted scheduling information to the MAC-e functional section 134.

The DPCH receiving section 135*i* is configured to perform a receive processing of a downlink "Dedicated Physical Channel (DPCH)" transmitted from the cell.

Here, the DPCH includes a "Dedicated Physical Data channel (DPDCH)" and a "Dedicated Physical Control Channel (DPCCH)".

Figure 11:
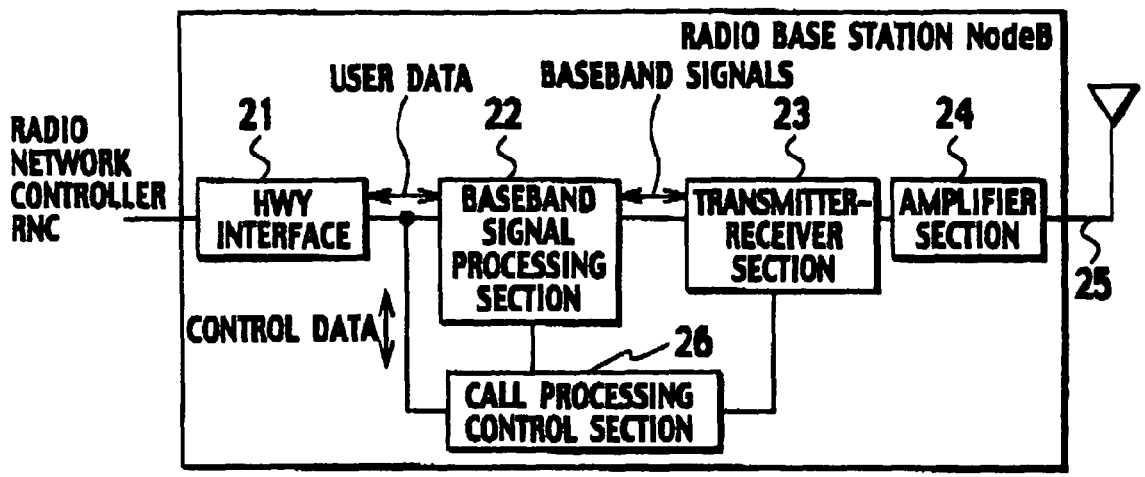
FIG. 11 is a functional block diagram of a radio base station according to the first embodiment of the present invention.

FIG. 11 shows an example of a configuration of functional blocks of a radio base station Node B according to this embodiment.

As shown in FIG. 11, the radio base station Node B according to this embodiment is provided with an HWY interface 21, a baseband signal processing section 22, a transmitter-receiver section 23, an amplifier section 24, a transmission-reception antenna 25, and a call processing control section 26.

The HWY interface 21 is configured to receive downlink user data to be transmitted from the radio network controller RNC, which is located in an upper level of the radio base station Node B, so as to enter the received downlink user data to the baseband signal processing section 22.

In addition, the HWY interface 21 is configured to transmit uplink user data from the baseband signal processing section 22 to the radio network controller RNC.

The baseband signal processing section 22 is configured perform the layer-1 processing such as channel encoding processing, spreading processing, and the like, to the downlink user data, so as to transmit the baseband signal including the downlink user data to the transmitter-receiver section 23.

In addition, the baseband Signal processing section 22 is configured to perform the layer-1 processing such as despreading processing, RAKE combining processing, error correction decoding processing, and the like, to the baseband signal, which is acquired from the transmitter-receiver section 23, so as to transmit the acquired uplink user data to the HWY interface 21.

The transmitter-receiver section 23 is configured to convert the baseband signal, which is acquired from the baseband signal processing section 22, to radio frequency signals.

In addition, the transmitter-receiver section 23 is configured to convert the radio frequency signals, which are acquired from the amplifier section 24, to the baseband signals.

The amplifier section 24 is configured to amplify the radio frequency signals acquired from the transmitter-receiver section 23, so as to transmit the amplified radio frequency signals to the mobile station UE via the transmission-reception antenna 25.

In addition, the amplifier section 24 is configured to amplify the signals received by the transmission-reception antenna 25, so as to transmit the amplified signals to the transmitter-receiver section 23.

The call processing control section 26 is configured to transmit/receive the call processing control signals to/from the radio network controller RNC, and to perform the processing of condition control of each function in the radio base station Node B, allocating hardware resource in layer-3, and the like.

Figure 12:
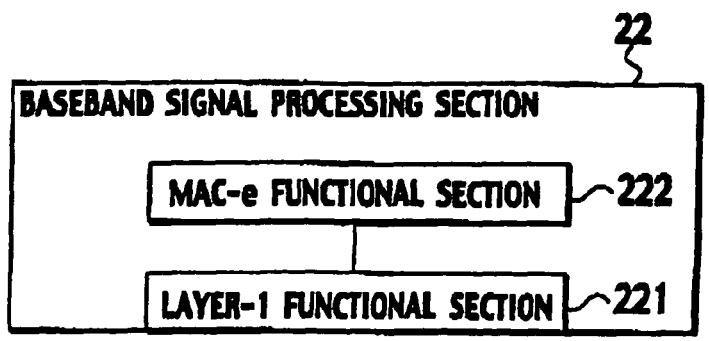
FIG. 12 is a functional block diagram of a baseband signal processing section in the radio base station of the mobile communication system according to the first embodiment of the present invention.

FIG. 12 is a functional block diagram of the baseband signal processing section 22.

As shown in FIG. 12, the baseband signal processing section 22 is provided with a layer-1 functional section 221, and a MAC-e functional section 222.

Figure 13:
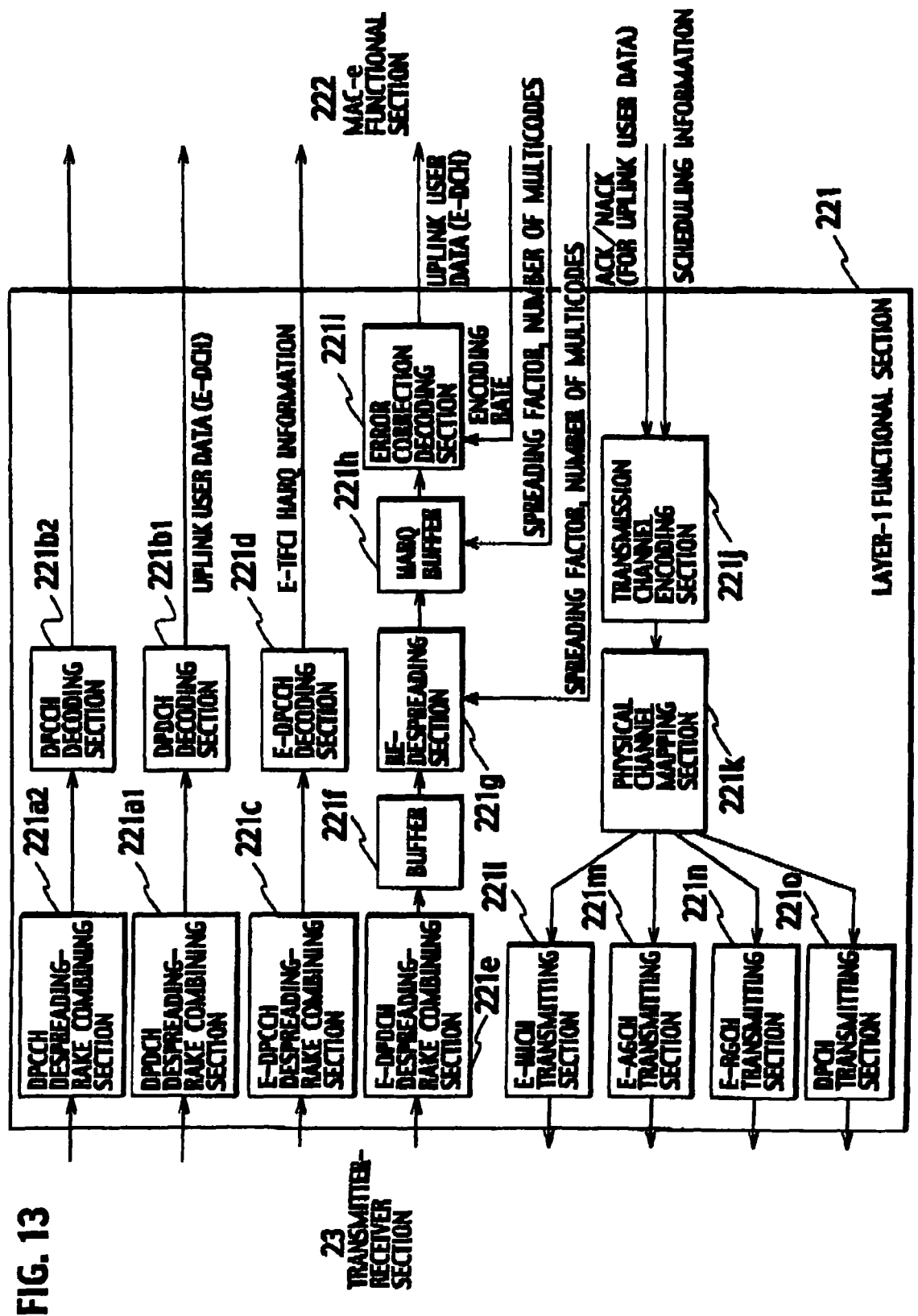
FIG. 13 is a functional block diagram of a layer-1 functional section in the baseband signal processing section in the radio base station of the mobile communication system according to the first embodiment of the present invention.

As shown in FIG. 13, the layer-1 functional section 221 is provided with a DPDCH despreading-RAKE combining section 221*a*1, a DPDCH decoding section 221*b*1, a DPCCH despreading-RAKE combining section 221*a*2, a DPCCH decoding section 221*b*2, an E-DPCCH despreading-RAKE combining section 221*c*, E-DPCCH decoding section 221*d*, an E-DPDCH despreading-RAKE combining section 221*e*, a buffer 221*f*, a re-despreading section 221*g*, an HARQ buffer 221*h*, an error correction decoding section 221*i*, a transmission channel encoding section 221*j*, a physical channel mapping section 221*k*, an E-HICH transmitting section 221*l*, an E-AGCH transmitting section 221*m*, an E-RGCH transmitting section 221*n*, and a DPCH transmitting section 221*o*.

However, these functions do not have to be independently present as hardware. That is, these functions can be partly or entirely integrated, or can be configured through a process of software.

The DPDCH despreading-RAKE combining section 221*a*1 is configured to perform the despreading processing and the RAKE combining processing to the DPDCH.

The DPDCH decoding section 221*b*1 is configured to decode the uplink user data transmitted from the mobile station UE, based on the output from the DPDCH despreading-RAKE combining section 221*a*1, so as to transmit the decoded uplink user data to the MAC-e functional section 222.

Here, the above uplink user data includes a measurement report, which reports reception power of a common pilot channel transmitted from the mobile station UE.

The DPCCH despreading-RAKE combining section 221*a*2 is configured to perform the despreading processing and the RAKE combining processing to the DPCCH.

The DPCCH decoding section 221*b*2 is configured to decode the uplink control information transmitted from the mobile station UE, based on the output from the DPCCH despreading-RAKE combining section 221*a*2, so as to transmit the decoded uplink control information to the MAC-e functional section 222.

The E-DPCCH despreading-RAKE combining section 221*c* is configured to perform the despreading processing and RAKE combining processing to the E-DPCCH.

The E-DPCCH decoding section 221*d* is configured to decode the E-TFCI for determining the transmission rate of the uplink user data (or an "Enhanced Transport Format and Resource Indicator (E-TFRI)" based on the output from the E-DPCCH despreading-RAKE combining section 221*c*, so as to transmit the decoded E-TFCI to the MAC-e functional section 222.

The E-DPDCH despreading-RAKE combining section 221*e* is configured to perform the despreading processing to the E-DPDCH using the spreading factor (the minimum spreading factor) and the number of multi-codes which correspond to the maximum rate that the E-DPDCH can use, so as to store the despread data to the buffer 221*f*. By performing the despreading processing using the above described spreading factor and the number of multi-codes, it is possible for the radio base station Node B to reserve the resources so that the radio base station Node B can receive the uplink data up to the maximum rate (bit rate) that the mobile station UE can use.

The re-despreading section 221*g* is configured to perform the re-despreading processing to the data stored in the buffer 221*f* using the spreading factor and the number of multi-codes which are notified from the MAC-e functional section 222, so as to store the re-despread data to the HARQ buffer 221*h*.

The error correction decoding section 221*i* is configured to perform the error correction decoding processing to the data stored in the HARQ buffer 221*h* based on the coding rate which is notified from the MAC-e functional section 222, so as to transmit the acquired "uplink user data (E-DCH)" to the MAC-e functional section 222.

The transmission channel encoding section 221*j* is configured to perform the necessary encoding processing to the ACK/ACK and the scheduling information for the uplink user data received from the MAC-e functional section 222.

The physical channel mapping section 221k is configured to pair the ACK/NACK for the uplink user data, which is acquired from the transmission channel encoding section 221j, with the E-HICH, to pair the scheduling information (absolute transmission rate), which is acquired from the transmission channel encoding section 221h, with the E-AGCH, and to pair the scheduling information (relative transmission rate), which is acquired from the transmission channel encoding section 221j, with the E-RGCH.

The E-HICH transmitting section 221l is configured to perform a transmission processing of the E-HICH.

The E-AGCH transmitting section 221m is configured to perform a transmission processing to the E-AGCH.

The E-RGCH transmitting section 221n is configured to perform a transmission processing to the E-RGCH.

The DPCH transmitting section 221o is configured to perform a transmission processing to a downlink "Dedicated Physical Channel (DPCH)" transmitted from the radio base station Node B.

Figure 14:
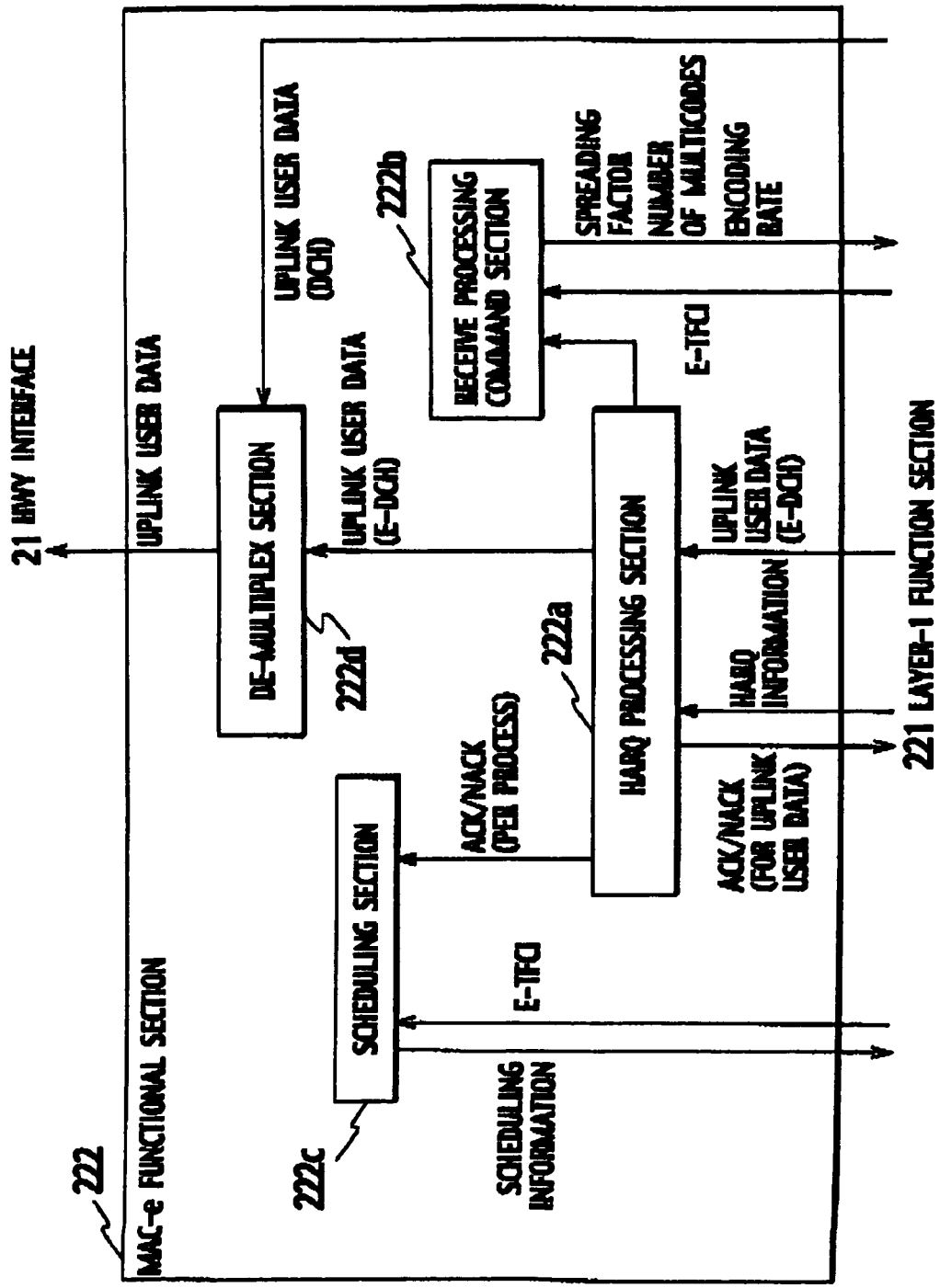
FIG. 14 is a functional block diagram of a MAC-e functional section in the baseband signal processing section in the radio base station of the communication system according to the first embodiment of the present invention.

As shown in FIG. 14, the MAC-e functional section 222 is provided with an HARQ processing section 222a, a receive processing command section 222b, a scheduling section 222c, and a de-multiplex section 222d.

The HARQ processing section 222a is configured to receive the uplink user data and the HARQ information which are received from the layer-1 functional section 221, so as to perform the HARQ processing on the "uplink user data (E-DCH)".

In addition, the HARQ processing section 222a is configured to notify, to the layer-1 functional section 221, the ACK/NACK (for the uplink user data) which shows the result of receive processing on the "uplink user data (E-DCH)".

In addition, the HARQ processing section 222a is configured to notify, to the scheduling section 222c, the ACK/NACK (for the uplink user data) per process.

The receive processing command section 222b is configured to notify, to the re-despreading section 221g and the HARQ buffer 221h, the spreading factor and the number of multi-codes for the transport format of each mobile station UE, which is specified by the E-TFCI per TTI received from the E-DPCCH decoding section 221b in the layer-1 functional section 221. Then, the receive processing command section 222b is configured to notify the encoding rate to the error correction decoding section 221i.

The scheduling section 222c is configured to change the absolute transmission rate or the relative transmission rate of the uplink user data, based on the E-TFCI per TTI received from the E-DPCCH decoding section 221d in the layer-1 functional section 221, the ACK/NACK per process received from the HARQ processing section 222a, the interference level, and the like.

In addition, the scheduling section 222c is configured to notify, to the layer-1 functional section 221, the absolute transmission rate or the relative transmission rate of the uplink user data, as the scheduling information.

The de-multiplex section 222d is configured to perform the de-multiplex processing to the "uplink user data (E-DCH and DCH)" received from the HARQ processing section 222a, so as to transmit the acquired uplink user data to the HWY interface 21.

Here, the above uplink user data includes a measurement report, which reports reception power of a common pilot channel transmitted from the mobile station UE.

The radio network controller RNC according to this embodiment is an apparatus located in an upper level of the radio base station Node B, and is configured to control radio communications between the radio base station Node B and the mobile station UE.

Figure 15:
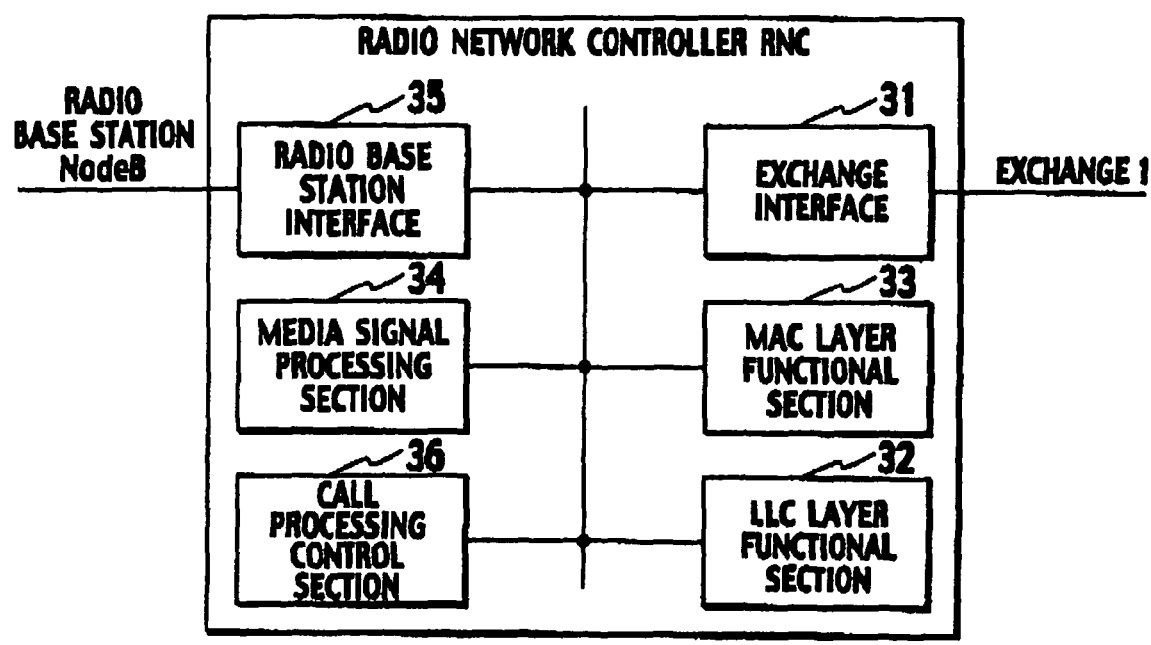
FIG. 15 is a functional block diagram of a radio network controller of the mobile communication system according to the first embodiment of the present invention.

As shown in FIG. 15, the radio network controller RNC according to this embodiment is provided with an exchange interface 31, a Logical Link Control (LLC) layer functional section 32, a MAC layer functional section 33, a media signal processing section 34, a radio base station interface 35, and a call processing control section 36.

The exchange interface 31 is an interface with an exchange 1, and is configured to forward the downlink signals transmitted from the exchange 1 to the LLC layer functional section 32, and to forward the uplink signals transmitted from the LLC layer functional section 32 to the exchange 1.

The LLC layer functional section 32 is configured to perform an LLC sub-layer processing such as a combining processing of a header or a trailer such as a sequence pattern number.

The LLC layer functional section 32 is also configured to transmit the uplink signals to the exchange interface 31 and to transmit the downlink signals to the MAC layer functional section 33, after the LLC sub-layer processing is performed.

The MAC layer functional section 33 is configured to perform a MAC layer processing such as a priority control processing or a header adding processing.

The MAC layer functional section 33 is also configured to transmit the uplink signals to the LLC layer functional section 32 and to transmit the downlink signals to the radio base station interface 35 (or the media signal processing section 34), after the MAC layer processing is performed.

The media signal processing section 34 is configured to perform a media signal processing against voice signals or real time image signals.

The media signal processing section 34 is also configured to transmit the uplink signals to the MAC layer functional section 33 and to transmit the downlink signals to the radio base station interface 35, after the media signal processing is performed.

The radio base station interface 35 is an interface with the radio base station Node B. The radio base station interface 35 is configured to forward the uplink signals transmitted from the radio base station Node B to the MAC layer functional section 33 (or the media signal processing section 34) and to forward the downlink signals transmitted from the MAC layer functional section 33 (or the media signal processing section 34) to the radio base station Node B.

The call processing control section 36 is configured to perform a radio resource control processing, a channel setup and release processing by the layer-3 signaling, or the like. Here, the radio resource control includes call admission control, handover control, or the like.

In addition, the call processing control section 36 is configured to set the E-DPCCH transmission power offset, which is an offset from the transmission power of the DPCCH, and to transmit the E-DPCCH transmission power offset to the mobile station UE.

Operations of Mobile Communication System According to First Embodiment of the Present Invention Referring to FIG. 16, operations of a transmission power control method in the mobile communication system according to this embodiment will be described.

To be more specific, an example in which the mobile station UE has shifted from a Non-SHO state to a SHO state based on the transmission power control method according to this embodiment will be described.

In the transmission power control method according to this embodiment, the active set can be changed based on the predetermined conditions other than the above mentioned cases, so as to change the cells which establish radio links with the mobile station UE, or decrease the number of cells which establish radio links with the mobile station UE.

Here, a radio base station Node B according to this embodiment is configured to control one or a plurality of cells. In addition, in this embodiment, the cells include the functions of the radio base station Node B.

Here, the radio links according to this embodiment indicate the DPCH or the E-DPDCH between the mobile station UE and the cell.

Therefore, in this embodiment, the state in which the mobile station is establishing the radio link with only one cell is referred to "a Non-SHO state", and the state in which the mobile station UE is establishing the radio links with plurality of cells is referred to "a SHO state".

Further, in this embodiment, it can be configured that both of cell #10 and cell #20 are controlled by a same single radio base station Node B, or the each of cell #10 and cell #20 is controlled by different radio base stations Node B.

Figure 16:
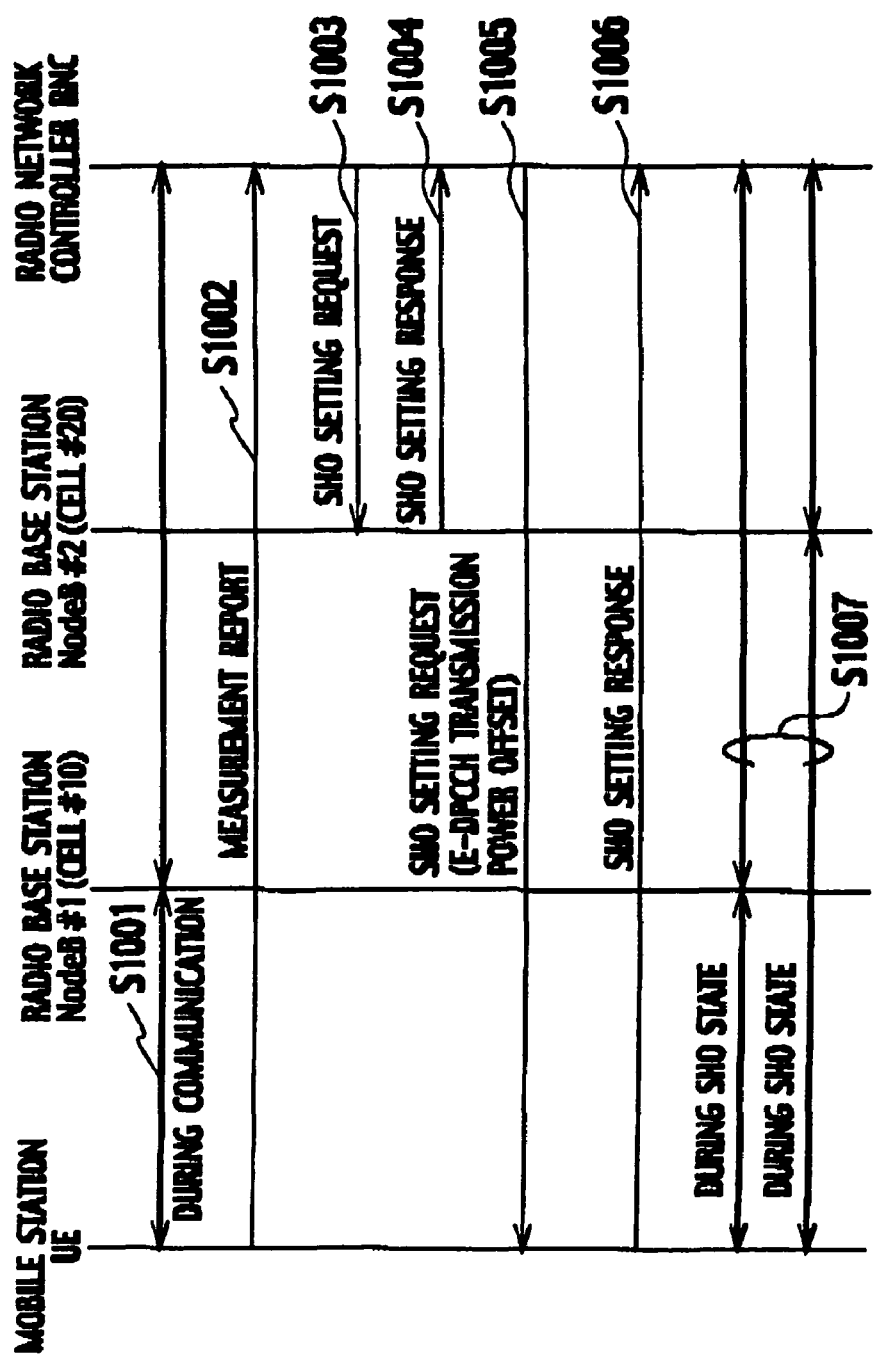
FIG. 16 is a sequence diagram showing operations of a transmission rate control method in the mobile communication system according to the first embodiment of the present invention.

As shown in FIG. 16, in step S1001, the mobile station UE is establishing a data connection for transmitting the uplink user data with the radio network controller RNC via the cell #10.

In step S1002, when the reception power of the common pilot signal from the cell #20 become more than or equal to the redetermined value, the mobile station UE transmits a measurement report to the radio network controller RNC.

The radio network controller RNC determines that the mobile station UE shifts to the SHO state, where the radio links with the cell #10 as well as the cell #20 are established, based on the measurement report from the mobile station UE.

In step S1003, the radio network controller RNC transmits, to the cell #20, a SHO setting request which requests the cell #20 to establish synchronization of radio links for uplink between the mobile station UE and the cell #20.

To be more specific, in step S1003, the radio network controller RNC transmits, to the radio base station Node B #2, a SHO setting request including SHO parameters. For example, the SHO parameters include a start time of the SHO, a channelization code for identifying a channel configuration of the radio links for the uplink, and a scrambling code for identifying the mobile station UE.

In step S1004, the cell #20 transmits a SHO setting response for indicating that the cell #20 has received the SHO setting request.

In step S1005, the radio network controller RNC requests the mobile station UE to establish synchronization of radio links for downlink between the cell #20 and the mobile station UE.

To be more specific, in step S1005, the radio network controller RNC transmits, to the mobile station UE, a SHO setting request including the SHO parameters For example, the SHO parameters includes a start time of the SHO, a channelization code for identifying a channel configuration of the radio links for the uplink, a scrambling code for identifying the mobile station UE, and the E-DPCCH transmission power offset.

In step S1006, the mobile station UE transmits a SHO setting response for indicating that the mobile station UE has received the SHO setting request.

The mobile station UE shifts from the Non-SHO state to the SHO state based on the parameters. In step S1007, the mobile station in the SHO state with the cell #10 and the cell #20.

Effects of Mobile Communication System according to First Embodiment of the Present Invention As described above, according to the present invention, it is possible to provide a transmission power control method which enables to certainly transmit an E-DPCCH to a radio base station Node B when an active set is updated, to realize a stable radio communication for uplink, and to reduce a deterioration of radio network capacity, and a radio network controller.

In other words, the radio network controller RNC notifies an E-DPCCH transmission power offset to the mobile station UE before the mobile station UE shifts to the SHO state, so that the radio network controller RNC can transmit the E-DPCCH certainly even after the mobile station UE has shifted to the SHO state. Therefore, according to the transmission power control method and the radio network controller RNC, it is possible to realize a stable radio communication for uplink, and to reduce a deterioration of radio network capacity.

Additional advantages and modifications will readily occur to those skilled in the art. Therefore, the invention in its broader aspects is not limited to the specific details and the representative embodiments shown and described herein. Accordingly, various modifications may be made without departing from the scope of the general inventive concept as defined by the appended claims and their equivalents.

What is claimed is:

1. A transmission power control method for controlling a transmission power of an uplink enhanced dedicated physical control channel, comprising:
    determining, at a radio network controller, that a mobile station transmitting the uplink enhanced dedicated physical control channel to only a first cell shifts to a soft handover state and transmits the uplink enhanced dedicated physical control channel to both the first cell and a second cell;
    determining, at the radio network controller, an uplink power offset between a desired transmission power of the uplink enhanced dedicated physical control channel and the transmission power of an uplink dedicated physical control channel;
    notifying, from the radio network controller to the mobile station, the uplink power offset;
    determining, at the mobile station, an updated transmission power of the uplink enhanced dedicated physical control channel to be transmitted to the first cell and the second cell based on the notified uplink power offset; and
    transmitting, at the mobile station, the uplink enhanced dedicated physical control channel to the first cell and the second cell using the updated transmission power.

2. The user data transmission method according to claim 1, wherein
    the radio network controller determines that the mobile station shifts to the soft handover state;
    the radio network controller transmits a soft handover setting request to the mobile station based on the first determination;
    the mobile station shifts to the soft handover state after the mobile station receives the soft handover setting request; and the soft handover setting request includes the uplink power offset.

3. A radio network controller used in a mobile communication system in which a mobile station controls a transmission power of an uplink enhanced dedicated physical control channel, comprising:
- a determiner configured to make a first determination that a mobile station transmitting the uplink enhanced dedicated physical control channel to only a first cell shifts to a soft handover state and transmits the uplink enhanced dedicated physical control channel to the first cell and a second cell;
- an offset determiner configured to determine an uplink power offset between a desired transmission power of the uplink enhanced dedicated physical control channel and the transmission power of an uplink dedicated physical control channel based on the first determination; and
- an offset notifier configured to notify the power offset to the mobile station.

4. A transmission power control method for controlling a transmission power of an uplink enhanced dedicated physical control channel, comprising:
- making a first determination, at a radio network controller, of an update of an active set of cells for a mobile station;
- determining, at the radio network controller, an uplink power offset between a desired transmission power of the uplink enhanced dedicated physical control channel and the transmission power of an uplink dedicated physical control channel based on the first determination;
- notifying, from the radio network controller to the mobile station, the uplink power offset;
- determining, at the mobile station, an updated transmission power of the enhanced dedicated physical control channel to be transmitted to a cell included in the updated active set, based on the notified first power offset; and
- transmitting, at the mobile station, the enhanced dedicated physical control channel to at least one cell included in the updated active set of cells using the updated transmission power.

5. A transmission power control method for controlling a transmission power of an uplink enhanced dedicated physical control channel, comprising:
- a radio network controller determining that a mobile station will be shifting to a soft handover state;
- the radio network controller calculating an uplink power offset between a desired transmission power of the uplink enhanced dedicated physical control channel and the transmission power of an uplink dedicated physical control channel based on the first determination, wherein the uplink power offset is based on radio links to be utilized by the mobile station during soft handover;
- the radio network controller sending a soft handover settings request to a base station that includes the uplink power offset;
- a radio network controller requesting the mobile station to synchronize a radio link with the base station to a radio link with a different base station based on the uplink power offset; and
- the mobile station transmitting an uplink enhanced dedicated physical control channel to the base station at a power based on the uplink power offset during the soft handover state.

* * * * *